United States Patent [19]
Horvath

[11] Patent Number: 5,188,692
[45] Date of Patent: Feb. 23, 1993

[54] METHOD FOR APPLYING ANTI-LACERATIVE FILM TO GLASS

[76] Inventor: Steven J. Horvath, 3205 Credit Woodlands, Mississauga, Ontario, Canada, L5C 1V3

[21] Appl. No.: 608,850

[22] Filed: Nov. 5, 1990

[51] Int. Cl.⁵ .......................... B29C 55/18; B32B 1/10
[52] U.S. Cl. ...................................... 156/212; 156/99; 156/228; 156/282; 156/311; 156/163
[58] Field of Search .............. 156/102, 104, 99, 583.1, 156/311, 212, 163, 229, 228, 282

[56] References Cited

U.S. PATENT DOCUMENTS

| | | | |
|---|---|---|---|
| 1,806,846 | 5/1931 | Fox et al. ...................... | 156/311 X |
| 2,417,837 | 3/1947 | Paggi ............................. | 156/104 X |
| 2,419,758 | 4/1947 | Borkland ...................... | 156/229 X |
| 2,515,830 | 7/1950 | Mahler ......................... | 264/DIG. 73 |
| 2,700,007 | 1/1955 | Dennison et al. ............. | 156/102 |
| 2,897,546 | 8/1959 | Clapp et al. .................. | 284/DIG. 73 |
| 3,806,387 | 4/1974 | Peetz ............................ | 156/102 |
| 3,808,077 | 4/1974 | Rieser et al. ................. | 156/99 |
| 3,879,251 | 4/1975 | Ingham ........................ | 156/311 |
| 3,900,673 | 8/1975 | Mattimoe et al. ........... | 156/99 X |
| 4,152,188 | 3/1979 | Friedrich et al. ............ | 156/102 X |
| 4,277,299 | 7/1981 | Clerenko et al. ............ | 156/99 |
| 4,365,547 | 12/1982 | Mclure, Jr. .................. | 156/583.1 X |
| 4,564,408 | 1/1986 | Crumbach et al. ........... | 156/212 |
| 4,772,006 | 9/1988 | Guglielmetti et al. ....... | 271/11 |
| 4,898,632 | 2/1990 | Roth et al. ................... | 156/99 |
| 4,973,364 | 11/1990 | Farrar et al. ................. | 156/85 X |

FOREIGN PATENT DOCUMENTS 63-71332 3/1988 Japan .
63-71334 3/1988 Japan .
323783 1/1930 United Kingdom .

*Primary Examiner*—Michael W. Ball
*Assistant Examiner*—Francis J. Lorin
*Attorney, Agent, or Firm*—Donald E. Hewson

[57] ABSTRACT

A method for laminating plastic film to glass is provided. The method includes the steps of providing a precast layer of glass on a support and placing a polymer film at a distance therefrom; then providing a ram with a lower surface having substantially the same contour as the top surface of the glass layer and providing a hard, flexible intermediate layer between the ram and the polymer film in which the intermediate layer has a contour that is more convex than that of the lower surface of the ram. The distance between the ram and the precast glass is then decreased such that initially the lower surface of the ram contacts the intermediate layer and the central portion of the intermediate layer contacts the polymer film at its center first and continues to stretch the polymer film into contact with the glass layer at its center outwardly towards the edges. Eventually the pressure is increased between the ram and the glass layer, heat is applied, and the glass layer and polymer film are laminated. The method can also be used to laminate together a polymer film between two glass layers or to laminate together two glass layers with two polymer films, one film between the glass and the other film on the surface of one of the glass layers.

11 Claims, 5 Drawing Sheets

METHOD FOR APPLYING ANTI-LACERATIVE FILM TO GLASS

FIELD OF THE INVENTION

This invention relates to laminated glass/plastic film structures, and is particularly directed to apparatus and methods for producing such laminated glass/plastic film structures. The invention is directed towards the production of glass/plastic film structures that are physically quite large; specifically and particularly, such glass/plastic film structures as are used for automobile windshields and side windows of automobiles and other vehicles, and indeed of other glass containing structures. The invention also provides that the multi-laminar glass/plastic film structures may be produced on apparatus and by the methods of the present invention efficiently and at much lower cost than has previously been possible.

BACKGROUND OF THE INVENTION

The present inventor is the applicant in several previous U.S. patent applications, specifically Ser. No. 07/315,298 filed Feb. 24, 1989, abandoned, and its divisional application Ser. No. 07/448,286 filed Dec. 11, 1989, abandoned. The previous patent applications teach an apparatus and method for laminating a layer of non-oriented polymer plastic to a precast layer of glass for much the same purposes as described above, and the present invention is particularly directed to improvements in the apparatus and methods as previously taught.

The automotive glass industry is, so far, highly labour intensive. For example, the preparation of a windshield or side window for an automobile very often requires a hand lay-up of the non-oriented plastic film to the glass. After the plastic film has been placed on the glass and perhaps most of the air bubbles caught between the film and the glass removed by use of a squeegee, a vacuum ring or other device may be placed around the periphery to pull as much air as possible from between the film and the glass. Thereafter, the glass/plastic film combination may be placed into an autoclave which is then pressurized and heated so as to adhere the non-oriented plastic film to the glass under pressure and heat conditions.

Most often, in such a structure the plastic film may be a composite laminar structure of non-oriented polyvinyl butyral together with oriented polyethylene terephthalate (PVB/PET), or it may be a composite laminar film of non-oriented polyurethane together with polyethylene terephthalate; or it may be PVB or polyurethane. The polyvinyl butyral (or polyurethane) is a generally soft non-oriented material which is quite often slightly embossed and somewhat opaque because of its surface character. However, the apparent opacity of the PVB disappears when the film surface is smooth, or is made smooth under the action of heat and/or pressure. The polyethylene teraphthalate is an oriented tough film which provides anti-lacerative characteristics to the glass/plastic film structure, because glass will shatter upon impact. The PVB layer adheres the PET layer to the glass, and also provides energy absorption in the event of impact with the composite laminar structure. Thus, the PET layer provides a barrier to protect a person from shattered glass shards in the event of an accident.

It is a characteristic of polymer plastic films as discussed herein that if there are any significantly large air bubbles entrapped in the interface between that film and glass, they may remain after heat and pressure treatment, particularly as in the prior art. However, if very small air bubbles are entrapped, and particularly if the film layer is PVB, they will be absorbed by the PVB. The difficulty is that significant air bubbles at the interface between the PVB and glass, or at the PVB/PET interface, or wrinkles that may occur in the PVB or PET, materially affect the optics of the glass/plastic film laminar structure in that an object viewed through the glass/plastic film laminate structure may appear to be distorted. This may be especially important in the event of use of glass/plastic film laminar structures as side windows of automobiles or other vehicles, since such windows are generally unframed, and the incidence of air bubbles or wrinkles especially near the edges of the glass is not acceptable.

The autoclave procedure to adhere a non-oriented plastic film to glass requires several hours per cycle, and it is not possible until the after the cycle has finished to determine if the glass/plastic film laminate workpiece being produced is acceptable. In other words, there is no determination of scrap (other than breakage) until after the autoclave cycle has been concluded. Moreover, the amount of unusable workpiece which become scrap may be high, so that the prior art autoclave production methods may be significantly inefficient as to the use of labour, the use of time, and particularly as to the use of energy.

In the meantime, the use of glass to which a polymer plastic film has been adhered as a windshield or as a side window of automobiles and the like has been approved, and it is expected that such use may become mandatory. In particular, use of such laminated glass/plastic film structures as side windows is a significant safety step as there is little that can be done to preclude impact of an object against the side window in the event of an accident where there may be relative sideways movement of any object to the side window; whereas the increasing use of seat belts—the use of which is mandatory in most jurisdictions—and the increasing use of air bags may reduce the chance of impact particularly of the head of a driver or passenger against the windshield of an automobile.

Still further, the production of PVB/PET having uniform thickness is difficult if not nearly impossible to achieve, because there may for example be gauge bands produced. Non-uniform thickness of the PVB/PET may again result in distortion which is visible, even if the distortion has a gauge thickness in the order of 0.00001 inch.

The above difficulty—eliminating gauge bands for example—can be overcome by bending two pieces of glass together so that they have essentially the same shape. Thereafter, one of the pieces of glass which is to be used as a side window for an automobile has the film placed on it. Then, the mating piece of glass may be placed on the film as a cover plate, and a vacuum ring or vacuum bag may be used to withdraw as much air as possible. After that, the combination of the glass having the PVB/PET film, and the cover plate of glass resting upon the PET, is autoclaved as discussed above. Finally, the structure is removed from the autoclave and the glass cover plate could possibly be re-used.

The present inventor has noted that the relatively soft PVB (or polyurethane) non-oriented plastic film layer may indeed act as a gauge when a ram or pusher is being used to press the film against the glass. What this does is to permit a slight adjustment of the glass and the pusher ram acting against it, and this phenomenon occurs as a function of the temperature and/or pressure working on the PVB. In any event, because cold or warm PVB has a moderate tensile strength, it is possible to push a ram against the film and to contact it against the glass—the details of which are discussed hereafter—so that when the film and glass are fully contacted in a manner that substantially precludes any large air bubbles to have occurred, the structure may be heated to the laminating temperature of the PVB.

Of interest in the prior art is U.S. Pat. No. 4,772,006 issued Sep. 20, 1988 to Guglielmetti et al. That patent contemplates multi-laminar glass/plastic film structures that may be glass/PVB/glass or glass/polyurethane/glass. However, the patent is particularly directed to an apparatus whose purpose is to grip and transfer a pre-cut and pre-stored sheet of flexible plastic film to the first layer of glass, after which the second layer of glass is placed on top. There is no particular or specific teaching of the steps that then follow: the patent suggests that the stack formation is then brought to an automatic assembly station which is a pressure sealing stage carried out at high temperature and pressure—in other words, an autoclave.

Two Japanese publications, Number 63/71332 and Number 63/71334, each published Mar. 31, 1988 in the name of Ishikawa and Kurita also referred to multiple laminations, in particular where laminations are placed on both sides of glass. However, in all events the processes discussed by Ishikawa and Kurita are carried out in a vacuum chamber or autoclave and result in a laminate structure which is sealed at its edges. Ishikawa and Kurita are particularly concerned with the probability of dust being deposited between the plastic film and the glass.

The present invention may apply to precast glass which is essentially flat, but it is especially adapted for precast glass that is curved such as for use as windshields and side windows of automobiles. Sometimes the contour of such precast glass may be quite complex.

As it happens, in a simple laminated structure having glass together with PVB/PET, the composite layer of non-oriented PVB polymer plastic film together with oriented PET polymer plastic film is applied to the inside surface of the glass—that is, to the concave side of the curve if the precast glass is curved, which will be the inside surface of the windshield or side window when in use.

Thus, the apparatus and methods of the present invention apply to the production of laminated glass and polymer plastic film whether the precast glass is flat, has a simple curvature, or a compound curvature.

One of the essential characteristics of the apparatus of the present invention is that at least one of the saddle—or at least the face of the saddle that is next to the glass when the glass is placed in the saddle—the ram, or both, should have good heat transfer characteristics. Thus, when it is desired in practicing the methods of the present invention for the glass to be heated up, heat is transferred to the glass through the saddle quite quickly; and likewise, when it is desired for the glass to be cooled down, heat is extracted from the glass through the saddle quite quickly.

As described hereafter, although it is usual for the heat to be transferred to the glass through the saddle, it is possible to heat and cool the ram, or to heat one of the saddle and the ram and to cool the other. The present invention also contemplates that one of the saddle and the ram—usually the saddle—may be constantly heated, and the other—usually the ram—may be cooled sufficiently as to cause gross heat extraction away from the glass and polymer plastic combination.

Obviously, the surface of the upper side of the saddle must conform to the surface of the outer curvature of the glass so as to fully support the glass. It is possible that the upper face of the saddle may be lined, particularly as discussed hereafter.

In any event, if the surface of the saddle has essentially the same coefficient of heat expansion and contraction as that of glass, then as the glass is heated up and cooled down there is essentially zero slippage of the glass with respect to the face of the saddle. Obviously, as the glass is being heated up and cooled down while the ram is exerting pressure against the upper side of the glass, if the glass has a coefficient of heat expansion and contraction which is significantly different than that of the saddle, then either the saddle or the glass will expand or contract at a different rate than the other. Since glass has very little or substantially zero tensile strength, although it has quite high compression strength, if the saddle is permitted to expand faster than the glass then there is a possibility that the glass will break as it is being heated because the saddle will have expanded faster. Likewise, if the saddle expands (and contracts) slower than the glass, then there is a likelihood that the glass will break during cool-down. Such breakage may occur because of the friction between the glass and the surface of the saddle.

It is possible for the surface of the saddle to be coated with a material that permits some slippage, such as silicone or PTFE.

As discussed hereafter, the present invention contemplates that stainless steel—for example stainless steel (compound SS430)—is particularly useful because it has a coefficient of heat expansion which is quite similar to that of glass. Alternatively, an aluminum base plate (or a base plate of other metal having high heat transfer characteristics, such as brass or copper) may be used because of the higher heat conductivity than that of steel, so that the base plate may be heated and cooled using appropriate heaters and cooling fluids and the like, with a stainless steel face being presented against the glass by the top of the saddle.

It is desirable for the surface of the saddle to be machined as closely as possible to the outside curvature or contour of the glass to be placed on it. However, because glass is reasonably flexible, at least ordinary manufacturing tolerances in terms of preparation of the surface of the saddle may be accommodated.

As discussed hereafter, the present invention also contemplates multi-laminar compound structures having two layer of glass with at least one layer of non-oriented polymer plastic film, one layer of oriented polymer plastic film, and perhaps even two layers of non-oriented polymer plastic film. Even in the event of the manufacture of windshields, because of the specific structures of the ram and saddle as discussed in detail hereafter, the apparatus and methods of the invention are more tolerant of mismatched pairs of glass in such multi-laminar structures as contemplated immediately above.

SUMMARY OF THE INVENTION

As noted above, the present invention contemplates the production of complex single or multi-layer glass structures having oriented and/or non-oriented polymer plastic films. For example, a windshield for an automobile may comprise laminates of glass, a non-oriented polymer plastic film, and glass; and the non-oriented polymer plastic film may be one of polyvinyl butyral and polyurethane. Methods and apparatus for producing such a windshield are provided by the present invention.

Likewise, a safety windshield or side window for an automobile may be produced in keeping with the present invention, where the safety windshield or side window comprises laminates of glass, a first non-oriented polymer plastic film, glass, and a second non-oriented polymer plastic film together with PET. The second non-oriented polymer plastic film layer may also be polyurethane; and in any event is placed on the inside surface of the safety windshield or side window when in use. The PET may also be laminated on that second layer, the PET being remote from the glass.

Thus, the present invention contemplates a complex bi-layer or multi-layer structure comprising: glass together with polyurethane; or glass together with polyurethane and PET; or glass together with PVB and PET; or glass together with polyurethane and a further layer of glass; or glass together with PVB and a further layer of glass; or glass together with PVB, a further layer of glass, and a further PVB/PET layer or a further polyurethane/PET layer; or glass together with polyurethane, a further layer of glass, and a further PVB/PET layer or a further polyurethane/PET layer.

The present invention further contemplates that the apparatus and methods taught herein can be placed and operated in any orientation. However, for ease of understanding, but not so as to limit the scope of the invention, the following discussions assume the apparatus to be placed so that the principal components are oriented horizontally and displaced or moved vertically.

In general, in the following discussions, and in the accompanying claims, the words "horizontal" and "horizontally", and the words "first direction" or "first orientation" may be read as being synonymous. Thus, it should be emphasized that the words "second direction" or "second orientation"—where the first and second directions or orientations are assumed to be generally mutually perpendicular—might in some circumstances also be synonymous with "horizontal" or "horizontally". Therefore, it is to be understood that there may be complete freedom as to the disposition and direction of operation of any of the components or the methods of the present invention, and that the following discussion is exemplary and not intended as being restrictive in scope.

As to the apparatus contemplated by the present invention, it comprises a supporting saddle for the glass, means for positioning a polymer plastic film in a first orientation (usually horizontally) a distance away from (usually above) and over the glass when the glass is placed on the saddle, a ram over the plastic film, and means to effect relative motion of the ram and the saddle in a first direction (usually vertical) so as to close the (vertical) distance between the ram and the plastic sufficiently as to cause the ram, the plastic film, the glass, and the saddle, all to be in intimate physical contact seriatim. At least one of the saddle and the ram is such that it is able to transmit heat to and absorb heat from the precast layer of glass which is placed on the saddle; and the contour of the first (upper) face of the saddle and the contour of the first (lower) face of the ram are each substantially identical to the respective first (lower) and second (upper) faces of the precast layer of glass which is placed in the saddle. At least the first (upper) surface of the saddle is of a material which has a substantially identical coefficient of heat expansion and contraction to that of the glass. By use of the apparatus as described above, there is substantially zero slippage that may occur between the contacting first (upper) surface of the saddle and the second (lower) surface of the glass as the glass is heated and cooled during the process of laminating the polymer plastic film to its second (upper) surface.

The saddle or the ram, or both, may be heated and cooled so as to quickly transmit heat to and absorb heat from the combination of the glass and the polymer plastic film. Moreover, one of the saddle and the ram—usually the saddle—may be constantly heated, and the other—usually the ram—may be cooled sufficiently as to cause gross heat extraction away from the glass and polymer plastic combination.

The polymer plastic film is held or positioned in such a manner that it may move and change its linear dimensions under the effect of heat and/or pressure being applied to it or to which it is exposed. Thus, the zero slippage condition referred to above is attained.

The discussion hereafter assumes the orientation of the apparatus and the glass to be as indicated above, without unduly restricting the disposition and modes and directions of operation of the apparatus.

The means to effect relative vertical motion of the ram and the saddle may comprise means to lower the ram towards the saddle, or it may comprise means to lift the saddle towards the ram. In the first instance, the saddle is fixed, and in the second instance the ram is fixed. It is preferred for the saddle to be lifted towards the ram so as to avoid placing hydraulic fittings and fixtures of any sort above the saddle. Almost invariably hydraulic fittings and fixtures will tend to leak; and by not having any potential leak sources above the saddle, the possibility of hydraulic fluid dropping on to the saddle or on to product placed in the saddle is precluded.

Specific features of the apparatus are described in detail hereafter.

Moreover, a further improvement to the apparatus described above comprises the provision of a further layer of flexible hard material which is placed below the lower surface of the ram. When the ram is movable, the extra layer of hard material is clamped so as to be movable therewith. In any event, an extendible piston is provided that acts against the upper side of the flexible material at the centre thereof, so as to flex the flexible material from the centre thereof independently of the ram, downwardly towards the precast glass when it is placed in the saddle. The piston is force displaced further so that the flexible material will progressively contact a larger area of the film and glass being laminated to it as the ram is moved downwardly towards the saddle or the saddle is moved upwardly towards the ram.

The polymer plastic film may be a composite material of non-oriented and oriented polymer plastic films such as PVB/PET or polyurethane/PET, or it may be a single layer of non-oriented PVB or polyurethane— especially in the case when it is intended for a further layer of glass to be laminated to the structure.

It is particularly contemplated that the lower surface of the ram is coated with an elastically deformable material such as silicone rubber that has heat resistance up to a temperature that is at least slightly above the highest temperature to which the glass will be heated when it is in place on the saddle and when it is being contacted by the lower surface of the ram.

A further improvement contemplates that the elastically deformable material on the face of the ram may be bounded at its periphery by a vertically positioned barrier cage which is formed in the same shape as the outer periphery of the precast glass that is placed in the saddle, but which is slightly larger than the precast glass so as to extend beyond the periphery thereof. It has been noted that particularly when the elastically deformable material such as silicone rubber is contained by the barrier cage, the deforming pressure within that material is substantially constant throughout the material, and is substantially constant in all directions, in much the same manner as occurs when a fluid is pressurized.

The present invention also provides a method of laminating a polymer plastic film to a precast layer of glass, which comprises the following steps:

(a) placing a precast glass on a saddle which is contoured to substantially the identical contour of the lower surface of the precast layer of glass, which saddle is adapted to transmit heat to and to absorb heat from the precast layer glass;

(b) disposing a polymer plastic film horizontally above and over the saddle;

(c) closing the distance between a contoured ram above the plastic and which has a contour on its lower surface substantially identical to the contour of the upper surface of the precast layer of glass and the saddle, towards the glass; so that the lower surface of the ram first contacts the polymer plastic film, and it then stretches the film and forces it into contact with the upper surface of the precast layer of glass;

(d) increasing the pressure between the ram and the precast layer of glass and the polymer plastic layer film up to a predetermined level, and then maintaining the pressure at that level;

(e) heating the combination of the precast layer of glass and the polymer plastic film to a predetermined temperature, and maintaining that temperature for a predetermined period of time;

(f) thereafter, cooling the combination of the precast layer of glass and the polymer plastic film to a predetermined temperature;

(g) thereafter, releasing the pressure of the ram against the by then laminated layer of polymer plastic film on the precast glass; and (h) thereafter, removing the laminated plastic and precast glass composite structure from the saddle.

As noted above, the present invention contemplates that either, or both, of the ram and the saddle may be heated and cooled so as to quickly transmit heat to and absorb heat from the combination of the glass and the polymer plastic film. Moreover, one of the saddle and the ram—usually the saddle—may be constantly heated, and the other—usually the ram—may be cooled sufficiently as to cause gross heat extraction away from the glass and polymer plastic combination.

As further described above, the present invention contemplates further that the ram may be provided with an intermediate flexible layer of hard material placed below the lower surface of the ram (which may be clamped so as to be movable therewith if the ram is movable), and an extendible piston is provided that acts against the upper surface of the flexible material at the centre thereof so as to flex the flexible material from the centre thereof independently of the ram. In that case, the method described above may further include the steps of:

(i) prior to step (c), extending the extendible piston against the flexible material so as to first contact the clamped polymer plastic film at the centre thereof;

(j) thereafter, executing step (c) while, at the same time, gradually withdrawing the extendible piston away from the flexible material while maintaining some pressure thereagainst, so that a progressively larger area of the film will contact the precast glass; and (k) thereafter, when the extendible piston has been fully withdrawn and the film and glass are in contact over the entire area of the glass, proceeding with steps (d) et seq.

Where the composite glass/plastic film structure to be produced comprises two layers of glass with a plastic film between them, which plastic film constitutes a bonding agent for the two layers of glass and may be PVB or polyurethane, the method of the present invention comprises the further steps of:

(l) after step (b), placing a further precast glass layer on the plastic film, where the further precast glass layer has a slightly different contour than the first precast glass layer so as to be capable of being pressed onto the first precast glass layer; and (m) thereafter, proceeding with steps (c) et seq.

Still further, the present invention contemplates the production of a composite structure that comprises glass, a single layer of non-oriented PVB or polyurethane, a further layer of glass, and a further composite layer of a non-oriented polymer plastic film together with an oriented polymer plastic film—such as PVB/PET or polyurethane/PET—where the PET is remote from the second layer of glass and is on the inside surface of the composite structure when it is in use. In that case, the present invention provides further clamping means for that further composite plastic layer, and the further steps of:

(n) after step (l), repeating step (b) with a composite polymer plastic film which may be PVB laminated with PET or polyurethane laminated with PET; and (o) thereafter, proceeding with steps (c) et seq.

The present invention contemplates yet a further variation of the apparatus and methods discussed above, where the contact pressure of the ram against the plastic, and of the plastic against the glass, progresses from one edge to the other. In this case, the face of the ram and the upper surface of the saddle—and the glass resting on it—are slightly tilted away from each other. The elastically deformable nature of the face of the ram assures a "rolling" contact line of the plastic to the glass as pressure between the ram and the saddle is increased.

BRIEF DESCRIPTION OF THE DRAWINGS

The invention will be described in greater detail hereafter, having regard to the accompanying drawings, in which.

DESCRIPTION OF THE PREFERRED EMBODIMENTS

Figure 1:
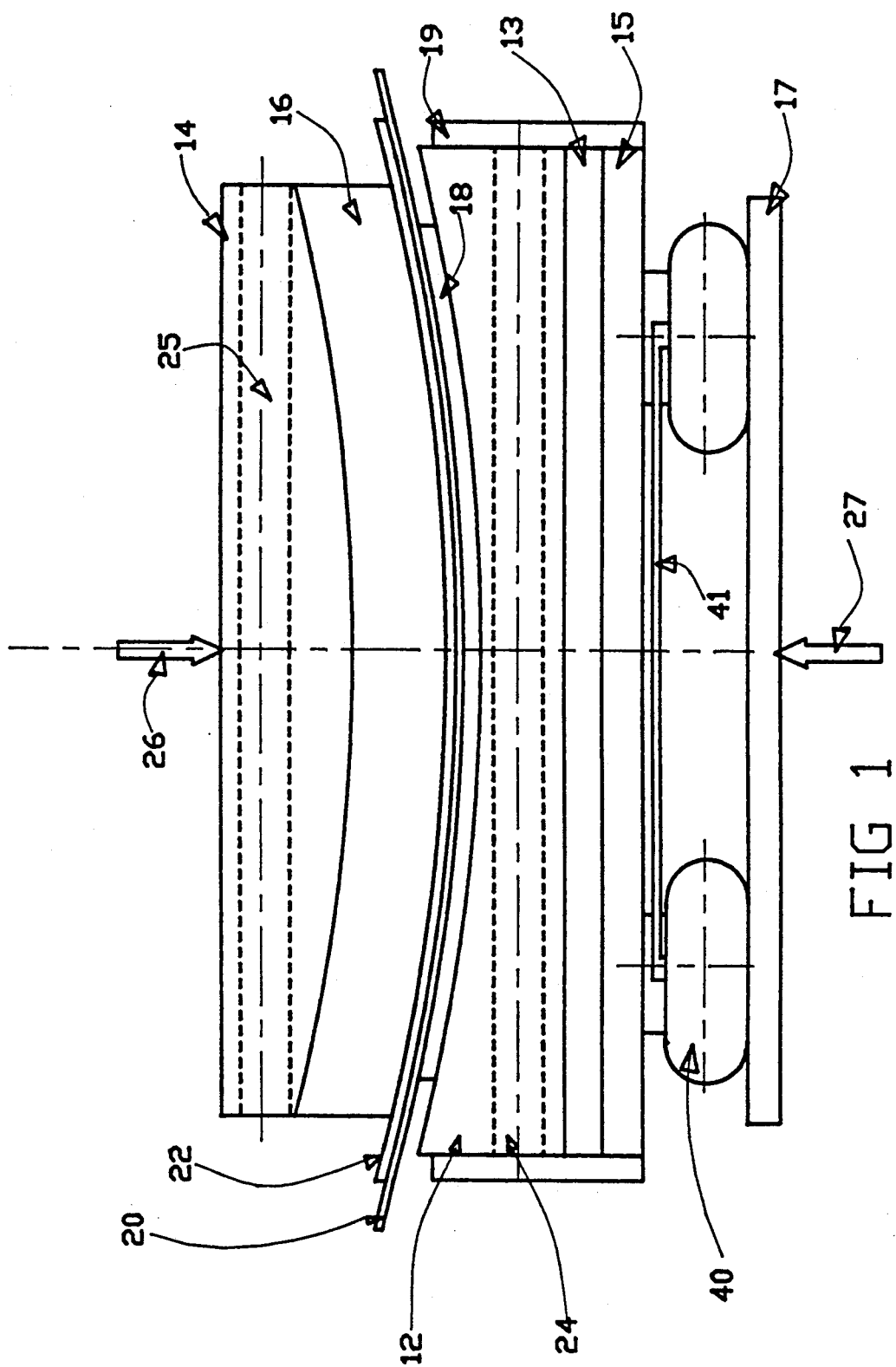
FIG. 1 is a notional side view of a first embodiment of the apparatus of the present invention showing the principal components of the invention.

As noted above, the present invention provides an apparatus for laminating polymer plastic film to glass; the present invention provides methods for producing multi-laminar glass and plastic film structures; and the present invention provides such multi-laminar structures when made in keeping with the teachings hereof.

Several general principles concerning the present invention, the operation of apparatus in keeping with the present invention, and the methods taught by the present invention, are now discussed:

In particular, the present invention is directed to laminating a polymer plastic film to glass (or glass to polymer plastic film) using pressure and heat. Particularly when the plastic film is such as PVB, polyurethane, PVB/PET, or polyurethane/PET, the working pressures and temperatures are relatively low. For example, at a temperature of approximately 150 degrees C., PVB will adhere to glass in a matter of up to 360 seconds under pressures of up to 150 psi. This permits sufficient time for the absorption of air at any interface with the PVB into the PVB. Once adhered, the plastic film remains adhered to the glass. Indeed, it is usual for plastic film adhered to glass in keeping with the present invention to withstand pull-apart tensions of up to 30 pounds per lineal inch.

In general terms, the present invention contemplates that a sheet of glass of any given contour is supported on a saddle whose upper face is substantially of the same contour as the lower face of the glass. As noted, that contour may be flat, simple curves, or it may have quite complex curvature. The saddle is lifted towards a ram (or the ram may be lowered towards the glass) so that the face of the ram contacts the polymer plastic film that has been interposed and positioned in place above the saddle and glass. The lower surface of the ram also has a substantially identical curvature to that of the upper surface of the glass, but is generally more tightly curved—or a further flexible hard material is movable with the ram but flexed downwardly towards the glass independently of the ram, as described hereafter.

In any event, the lower surface of the ram is coated by an elastically deformable material, usually to a uniform thickness. In the general embodiment of the present invention, as the distance between the ram and the saddle is closed, the lower surface of the ram contacts the centre of the glass first, and then the contact area progresses outwardly towards the periphery of the glass, so that contact of the plastic film to the glass is assured while at the same time essentially precluding the presence of other than very small air bubbles which can be absorbed into the plastic film as it is being heated.

In another embodiment of the invention, the contact of the face of the ram to the plastic film, and of the plastic film to the glass, first occurs at one edge thereof and progresses across the glass as the distance between the ram and the saddle is closed. In either event, the elastically deformable material on the lower surface of the ram must be soft enought that it will deflect under pressure; and of course, the elastically deformable material must have a heat resistance that it will not otherwise deform except by pressure at least up to temperature somewhat above the working temperature at which the non-oriented plastic film—PVB or polyurethane—is adhered to the glass. Generally, that means that the elastically deformable material on the face of the ram must have heat resistance as described above up to at least about 160 degrees C.

Reference is now made to the accompanying figures of drawings, where like components in the various figures are identified by identical reference numerals.

Figure 2:
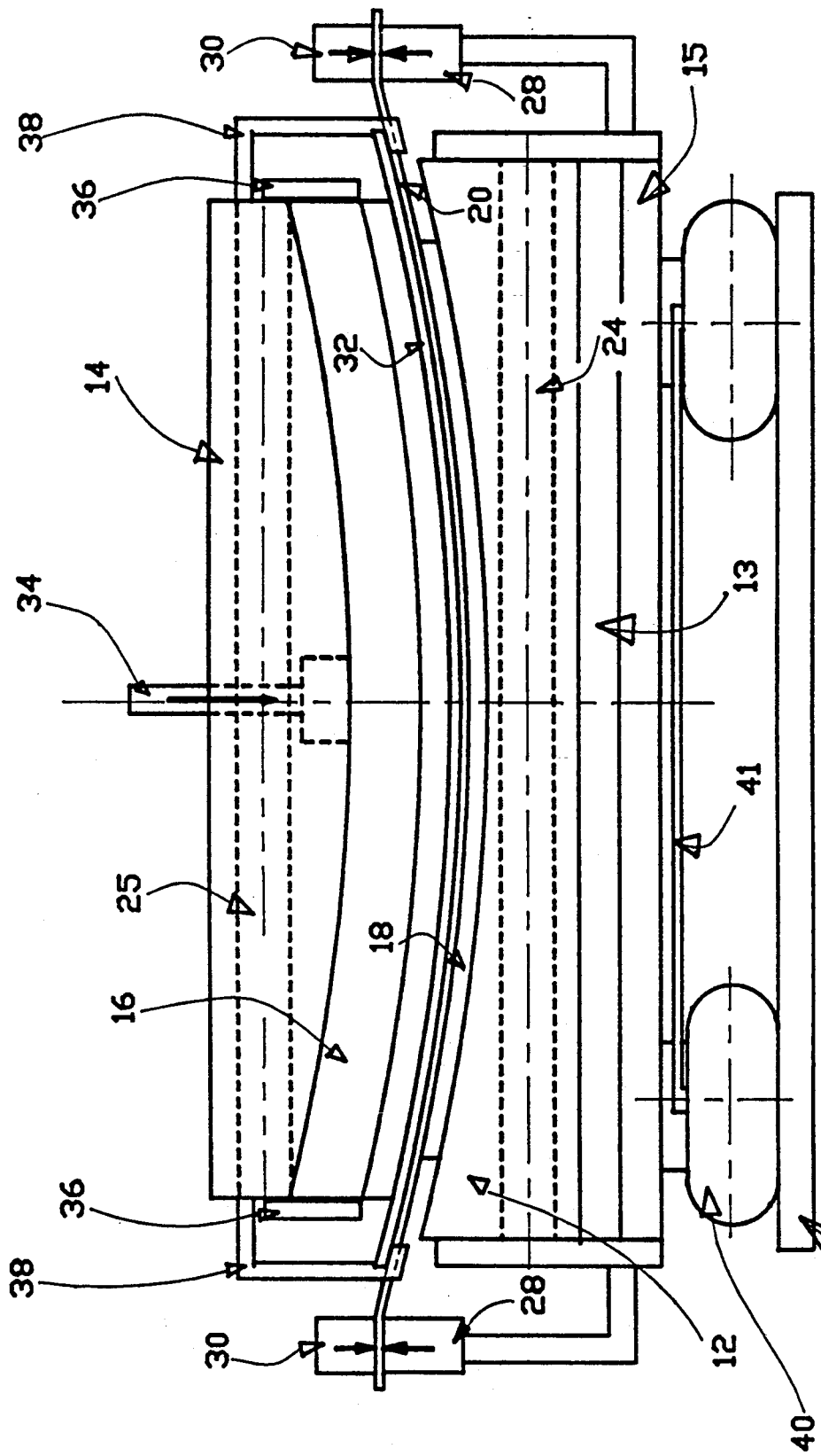
FIG. 2 is a notional side view of a further embodiment of the apparatus of the present invention, showing additional components of the invention.

Turning now to FIGS. 1 and 2, two slightly different embodiments are shown. The apparatus generally designated at 10 comprises a saddle 12 above which a ram 14 is located. The face of the ram 14 is coated, usually to a uniform thickness, with a layer 16 of elastically deformable material such as silicone rubber. The silicone rubber may have a Shore hardness of about 50, being soft enough to deflect under the pressure exerted by the ram as described hereafter.

A precast of layer of glass 18 is placed on the saddle 12, and above the precast layer of glass 18 there is suspended and positioned in place a layer of polymer plastic film 20. The film may be positioned such as by a pair of clamps exerting force against each other, as shown at 28 and 30 in FIG. 2.

For certain purposes as described hereafter, there may be a further thin layer of glass or other hard surfaced material 22 interposed between the upper surface of the plastic film 20 and the lower surface of the ram 16.

Within the saddle 12, there are located heating and cooling elements and ducts generally indicated at 24. The heating may be electric heating elements, and the cooling may be by circulating any suitable cooling liquid. In any event, the face of the saddle 12 which is in contact with the precast layer of glass 18 must have good heat transfer characteristics.

Similar heating and cooling elements and ducts 25 may be placed within the ram 14. It is assumed, in that case, that the structure of the ram also has good heat transfer characteristics so that the heat may be transferred to or absorbed from the glass and polymer plastic film.

In each of FIGS. 1 and 2 (and FIGS. 7 and 8) arrows 26 and 27 are shown. They are intended to indicate the closing pressure between the ram 14 and the saddle 12. It is understood that either the ram 14 may be lowered, or the saddle 12 may be raised (as discussed above) and that in either event the closing pressure between the ram 14 and saddle 12 is created as indicated by the arrows 26 and 27.

It is a feature of the present invention that at least the upper surface and the proximal region of the saddle 12 near the upper surface which is in contact with the glass 18, has essentially the same coefficient of heat expansion and contraction as that of the glass. Thus, as the saddle 12 is heated or cooled in order to heat or cool the glass 18, its surface expands or contracts linearly—that is, sideways—at essentially the same rate as the glass. Of course, it is possible that in some circumstances the upper face of the saddle 12 may be coated with a polymeric low friction coating so that a very small or limited amount of slippage of the glass with respect to the saddle may be permitted. That polymeric low friction coating may conveniently be a silicone compound or PTFE.

Generally, at least the upper surface or portion of the saddle 12 is made from stainless steel. It is particularly convenient to use stainless steel compound SS430, because that alloy has a coefficient of heat expansion and contraction which is quite similar to that of glass.

Alternatively, the lower portion of the saddle 12, including that portion of the saddle where the heating and cooling elements 24 are located, may be made from aluminum or other high heat conductivity metal, which has a higher thermal conductivity than stainless steel, thereby assuring fast and efficient heat transfer to the glass and fast and efficient heat transfer away from the glass (cooling). Similar heat transfer structure and characteristics may be employed in the support structure for the ram 14, as necessary and required.

As noted, the lower surface of the ram 14 may be coated or covered with an elastically deformable material such as silicone rubber indicated at 16. It is essential that the elastically deformable material should have a heat resistance up to a temperature at least slightly above the highest temperature to which the glass 18 will be heated during the laminating process. That temperature may be as high as 170 degrees C., so the elastically deformable material such as silicone rubber should have a heat resistance such that it does not distort due to heat alone below a temperature of at least about 170 degrees C. Moreover, the hardness of the silicone rubber is generally in the range of about 35 to 65 Shore, generally about 55 Shore. The elastically deformable material, while having good heat resistance characteristics, may also have good heat transfer characteristics so as to be able to transfer heat to and absorb heat from (or both) the glass and polymer plastic film combination.

In a further aspect of the present invention, the entire periphery of the silicone rubber or other elastically deformable material 16 is bounded at its periphery by a vertically positioned barrier cage 36. Generally, the barrier cage 36 is formed in the same shape as the outer periphery of the precast glass 18 which is placed on the saddle 12. However, the size of the elastically deformable material 16 and therefore the size of the vertically positioned barrier cage 36—or at least the area defined by the vertically positioned barrier cage 36—is slightly larger than the area of the precast glass 18. Thus, the barrier cage 36 extends beyond the periphery of the precast glass 18.

A still further aspect of the present invention is also shown particularly in FIG. 2. There, it will be noted that a further layer of flexible hard material such as glass 32—or stainless steel or other materials as discussed hereafter—is clamped in place below the silicone rubber 16 of the ram 14. Conveniently, the glass layer 32 is clamped by such means as the clamps 38 which are secured to the ram, so that the glass layer 32 is movable with the ram 14. However, an extendible piston 34 is also provided, and it acts against the upper side of the glass layer 32 at the centre thereof. Thus, it can be seen that if the extendible piston 34 is operated so as to extend downwardly it will flex the flexible glass 32 from the centre thereof independently of the ram 14, downwardly towards the precast glass 18 when placed in the saddle 12.

The extendible piston 34 is arranged so that it may be withdrawn away from the flexible glass 32 while still maintaining some pressure against the flexible glass 32, so that the glass 32 will progressively contact a larger area of the film 20 and of the glass 18 to which the film 20 is being laminated as the distance between the ram 14 and the saddle 12 closes by lifting the saddle or lowering the ram.

Generally, the extendible piston 34 operates from an air cylinder (not shown), while the main pressure operating device for the ram 14 is hydraulically operated.

In general, the flexible hard material 32 is glass, which is most often pre-formed to the same contour as the upper side of the precast layer of glass 18—the side to which the plastic polymer film 20 is to be laminated. In some circumstances, the flexible hard material 32 can be fiberglass or epoxy, or stainless steel coated with fiberglass or epoxy. This is because the surface topography of the hard material will be transferred to the upper surface of the PET, or polyurethane if it is a single layer, and it is generally not possible to polish stainless steel to a sufficiently smooth surface that aberrations on the surface will not be noticed. Thus, fiberglass or epoxy coating cast against glass will provide the surface finish necessary for the optical characteristics that are required.

It should also be noted that, as the closing pressure between the ram and the saddle is being exerted against the film 20 and precast glass 18, and the extendible piston 34 is withdrawn, the differential changes of the pressure of the flexible material 32 against the film exerted by the extendible piston 34 and the ram 14 reduce from the centre outwards, until the flexible glass 32 assumes the same curvature as the lower surface of the compressible material 16. This assures that air entrapped between the film 20 and the precast glass 18 is driven out, and thus a bubble-free lamination of the film to the glass is assured.

As a practical matter, the saddle 12 may be placed on equalized float pads or fluid bags 40, or otherwise made self-aligning, so that alignment of the ram 14 with the saddle 12 and equal pressure over the entire surface of the precast glass 18 may be assured. Thus, when an apparatus as shown in FIG. 2 is being operated, where the lower surface of the flexible glass 32 touches the film 20 first at the centre of the precast glass 18 and the contact area extends as the extendible piston 34 is withdrawn and the ram 14 is lowered, or even as indicated in FIG. 1, then the float equalization pads 40 may self-adjust to assure that pressure over the surface is equalized.

The fluid bags 40 are interconnected as at 41, and are filled with a fluid that may be a compressible gas but is more usually a non-compressible liquid. When pressure is exerted against any one bag or any portion of a bag by operation of the ram 14 or piston 34, so that the pressure is transmitted through the saddle 12 to the fluid bags 40, then the fluid in them will flow to any area where there is a lower pressure, thus equalizing pressure in the fluid bags 40 as they support the saddle 12. A single fluid bag may be used in some instances.

In any event, as the ram 14 continues to be lowered and the extendible piston 34 retreats, then the float equalization exerted as a consequence of the float pads or fluid bags 40 becomes more effective.

The assembly of the support for the saddle 12 as shown in FIG. 1 may comprise an insulator layer 13 below the heating and cooling elements 24, supported by a steel plate 15. That steel plate 15 is, in turn, supported by the fluid bags 40, which rest on a further steel plate or other table 17. The edges of the saddle 12 may be surrounded by a further insulator 19, which serves to maintain a more even temperature gradient across the area of the saddle 12.

The relatively soft PVB (or polyurethane) will in some respects act as a gauge or shim so as to permit minor adjustments of the film and glass with respect to the lower surface of the ram, and thereby assuring a bubble-free lamination.

As noted above, it is a purpose of the elastically deformable rubber 16 or other material to act as a pressure distributor to ensure even pressure of the ram 14 against the film 20 and glass 18. Especially when PVB is used as the laminating film, it will generally laminate under pressures of about 40 psi to about 150 psi at temperatures of 120 degrees C. to 140 degrees C. Another purpose of the silicone rubber 16 is, therefore, to act as an insulator so that when the heating and cooling elements 24 and/or 25 are activated, there is no significant loss of heat and therefore of energy. Generally, however, the heating and cooling elements 24 are used, and then the silicone rubber is chosen to have good insulative properties. Because of that circumstance, the temperature of the silicone rubber 16 will lag that of the heated and cooled saddle 12.

A consequence of the above is that energy efficiencies of production of multi-laminar glass and polymer plastic film structures in keeping with the present invention, when compared to the energy requirements of an autoclave as discussed above to produce exactly the same structure, may be as much as 500% to 1000% more energy efficient.

Figure 3:
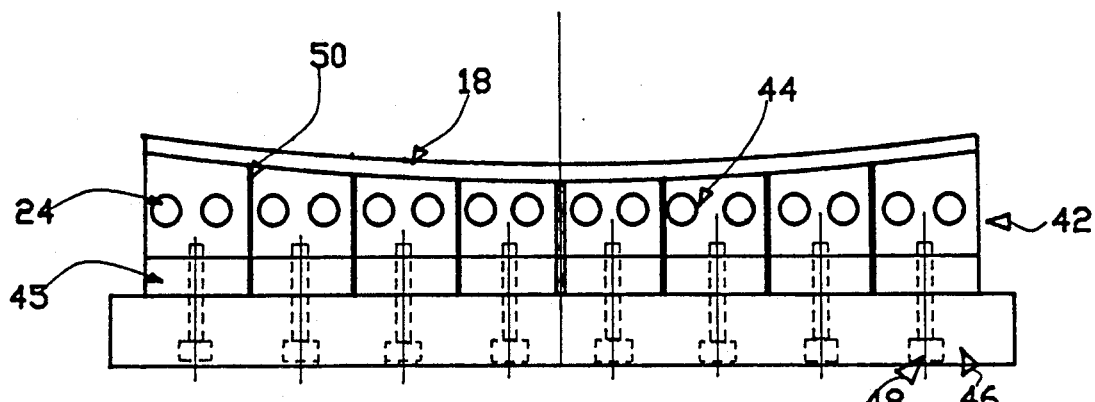
FIG. 3 is a notional side view of a yet further embodiment of the saddle component of the present invention.
Figure 4:
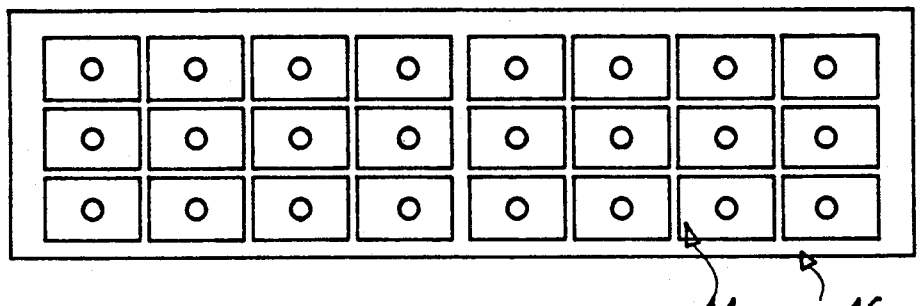
FIG. 4 is a top view of the saddle of FIG. 3.

Turning now to FIGS. 3 and 4, a further embodiment of the saddle of the present invention is shown. There, as before, the contour of the upper face of the saddle shown generally at 42 and the countour of the lower face of the ram 14 (not shown) are each substantially identical to the respective lower and upper surface contours of the precast layer of glass 18. However, the saddle 42 comprises a segmented face made up of a number of segments 44 which are secured to a backing plate 46 by means 48 which may be machine bolts or other suitable securing means. In this case the backing plate 46 is intended to operate cool, so that it does not undergo any significant dimensional changes. The heating and cooling elements 24 are installed in each of the segments 44; and they are insulated from the backing plate 46 by an insulating layer 45.

The upper segmented face of the saddle 42 comprises a plurality of segments 44, and each segment is spatially isolated from all other contiguous segments by gaps 50. The material of the segments 44 is such as to have a high coefficient of heat transfer, for example aluminum.

The saddle 42 is thereby such that the integrated coefficient of heat expansion over the area of the face of the saddle is essentially equal to that of the glass 18. Thus, there is substantially zero or very little gross expansion or contraction of the face of the saddle 42 compared to the expansion or contraction of the precast glass 18 as each is heated and cooled.

Needless to say, the structure of the ram 14 as described above, including the addition of the flexible glass 32 and extendible piston 34, works equally as well with the segmented saddle 42 of FIGS. 3 and 4.

As noted, the present invention contemplates that the material of the non-oriented polymer plastic film 20 may be PVB or polyurethane, and that it may be laminated with PET. Moreover, the present invention contemplates that PVB or polyurethane may be used alone, where a further layer of glass is to be laminated into the structure with the first precast glass. In that instance, a composite PVB/PET film cannot be used because the glass would not adhere to the PET. FIG. 1 contemplates an additional thin layer of glass 22 placed above the plastic film 20. The glass 22 may serve two purposes: either it may act as an additional hard surface interposed between the silicone rubber 16 and the plastic film 20; or it may itself be intended to be laminated to the upper side of the plastic film 20 when it is PVB or polyurethane, for example. In the latter case, the lamination of the glass 32 to the film 20 may occur in two steps, so as to assure that the film 20 is adhered in a bubble free manner to the glass 18; but on the other hand, if the curvature of the face of the silicone rubber 16 on the ram 14 is sufficiently tighter than that of the upper face of the glass 18—the datum as far as the other lamina are concerned—then it is possible that the glass 32, the film 20, and the glass 18, may all be laminated in a single operation. This is discussed in more detail below, with special reference to FIGS. 5 and 7.

The steps of the present invention have been discussed above. Thus, having regard to the recital of the steps noted above, step (a) calls for the precast glass 18 to be placed on the saddle 12. Step (b) requires that the polymer plastic film 20 be clamped over the saddle; and step (c) calls for the distance between the contoured ram 14 having the flexible material 16 on its lower face and the saddle 12 to be closed, so that the lower face of the ram first contacts the film 20 and then stretches the film 20 and forces it into contact with the upper surface of the precast layer of glass 18.

Thereafter, as recited, step (d) provides for the pressure between the ram 14 and the precast layer of glass 18 and the plastic film 20 to be increased up to a predetermined level, and then maintained at that level. While the pressure is being maintained at the predetermined level, step (e) provides that the saddle is heated to a predetermined temperature, and maintained at that temperature for a predetermined period of time.

Thereafter, step (f) is followed to cool the saddle to a predetermined temperature, and then step (g) provides that the pressure of the ram against the plastic film 20—which is by then laminated to the precast glass 18—be released. Finally, step (h) provides for the laminated plastic and precast glass composite structure to be removed from the saddle 12.

As noted above, the present invention contemplates that either, or both, of the ram and the saddle may be heated and cooled so as to quickly transmit heat to and absorb heat from the combination of the glass and the polymer plastic film. Moreover, one of the saddle and the ram—usually the ram—may be constantly heated, and the other—usually the ram—may be cooled sufficiently as to cause gross heat extraction away from the glass and polymer plastic combination.

Having regard to the embodiment of the ram as shown in FIG. 2, the present invention provides for step (i) to be carried out prior to step (c), so that the extendible piston 34 is extended downwardly against the flexible material 32 so that the flexible material 32 first contacts the film 20 at the centre thereof. Afterwards, step (c) is carried out while, at the same time, the extendible piston 34 is gradually withdrawn away from the flexible material 32 while maintaining some pressure against it. In this manner, a progressively larger area of the film 20 will contact the precast glass—and, as discussed above, the contact of the film to the glass will be substantially bubble-free.

Thereafter, step (k) provides for the condition that when the extendible piston has been fully withdrawn and the film and glass are in contact over their entire area, then steps (d) et seq. are proceeded with.

Figure 5:
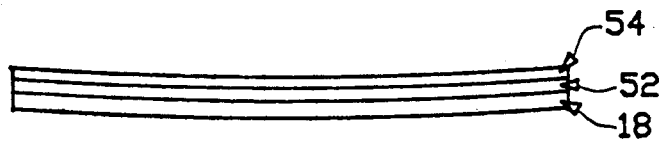
FIG. 5 is a side view of a typical multi-laminar structure manufactured in keeping with the teachings of the present invention.

As discussed, the present invention contemplates a structure such as that shown in FIG. 5, which comprises the precast glass 18, a layer 52 of non-oriented polymer plastic film which may be PVB or polyurethane, and a further layer of glass 54. To manufacture that structure, the present invention provides for the further steps (l) and (m) as follows:

Step (l) is carried out after step (b), and it involves placing a further precast glass layer 54 on the plastic film 20; it being noted that the further precast glass layer 54 has a slightly different contour than the first precast glass layer 18 so as to be capable of being pressed onto it. Thereafter, step (m) provides for steps (c) et seq. to be proceeded with.

Such a structure as described immediately above may be used for a windshield, comprising two layers of glass secured one to the other by the non-oriented polymer plastic film under heat and pressure as discussed.

The present invention further provides for a safety windshield or a side window for an automobile which would comprise laminates of glass, a first non-oriented polymer plastic film, a second laminate of glass, and a second composite film having non-oriented polymer plastic film together with PET, where the second non-oriented plastic film is placed so as to be on inside surface of the safety windshield or side window when in use. The first plastic film may be PVB or polyurethane; the second composite plastic film may be PVB/PET or polyurethane/PET with the PET being remote from the second layer of glass—in other words, the PVB or polyurethane serves to laminate the PET to the second layer of glass in the same manner as discussed above.

Figure 6:
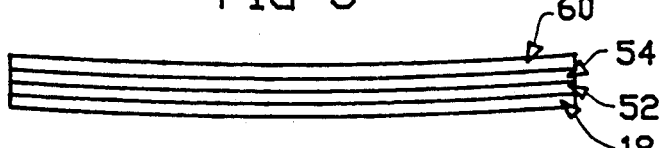
FIG. 6 is a side view of yet a further multi-laminar structure manufactured in keeping with the teachings of the present invention.

To manufacture that structure, shown in FIG. 6 having a first precast glass 18, a first plastic film 52, a second precast glass 54, and the second composite polymer plastic film 60, the present invention provides for step (n) which is carried out after step (l), and which essentially requires that step (b) be repeated using the composite plastic polymer film. Thereafter, step (o) provides for steps (c) et seq. to be proceeded with.

Figure 7:
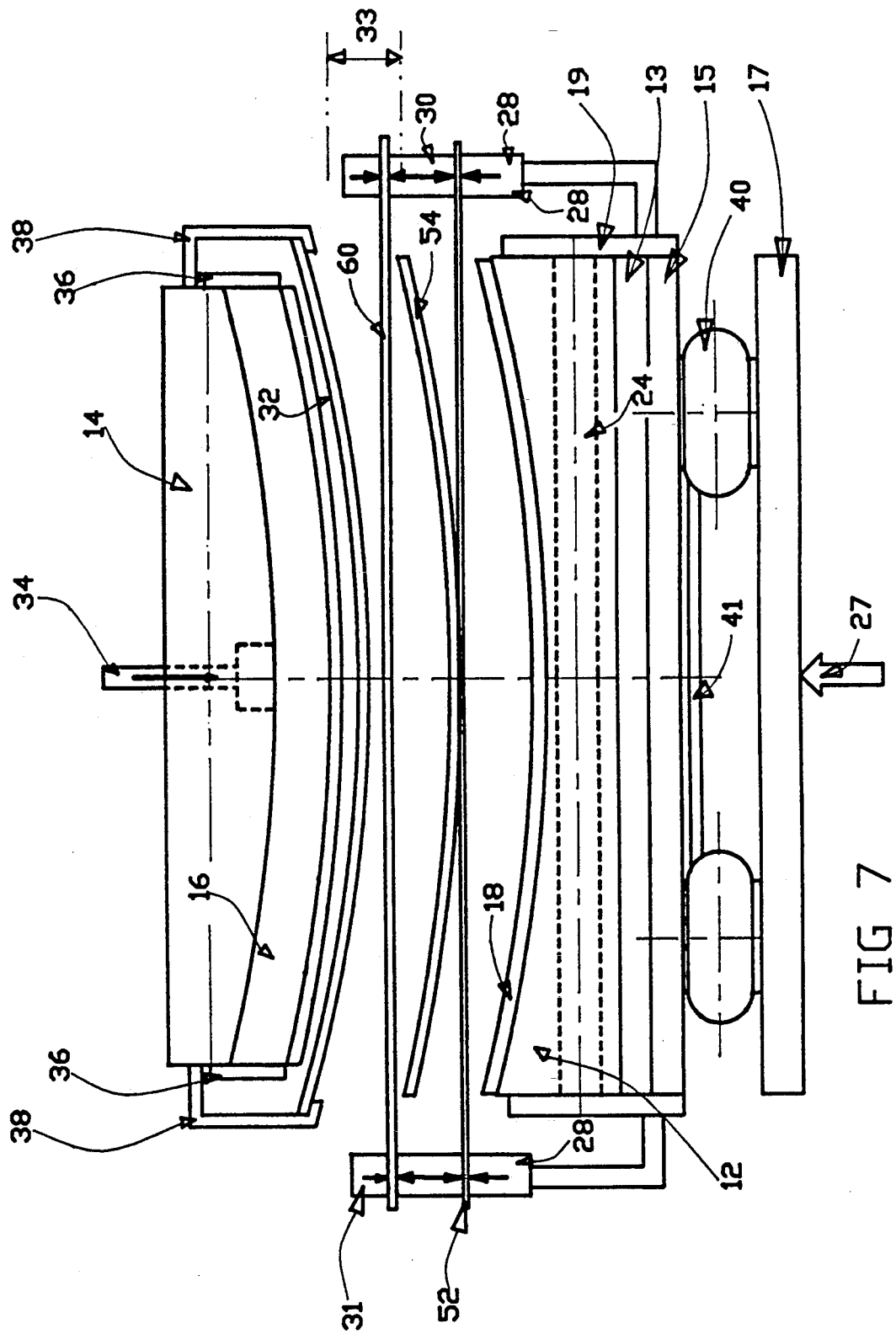
FIG. 7 is a notional side view of yet a further embodiment of the apparatus of the invention, particularly adapted to produce the structures shown in FIGS. 5 and 6.

To more fully describe the steps taken to manufacture the structures of FIGS. 5 and 6, reference is made to FIG. 7 which shows much the same features as in FIG. 2. However, FIG. 7 shows a structure which, in the embodiment shown includes, those components indicated in the interval 33, and which produces the multi-laminar structure of FIG. 6; and without the components shown at 33, the apparatus produces the multi-laminar structure of FIG. 5. It will be seen that the first plastic film 52 is clamped between the clamps 28 and 30, with the second precast glass 54 being placed on it as discussed above. If the structure of FIG. 5 is being produced, then the additional components are not present, and steps (l) and (m) are carried out.

If, on the other hand, it is intended to produce the multi-laminar structure of FIG. 6, then the additional clamping member 31 is in place acting against clamp 30 to hold the second composite polymer plastic film 60 in place. Thereafter, steps (n) and (o) are carried out. Thus, in either event, to produce the structure of either FIG. 5 or FIG. 6, a single clamping operation is carried out.

Figure 8:
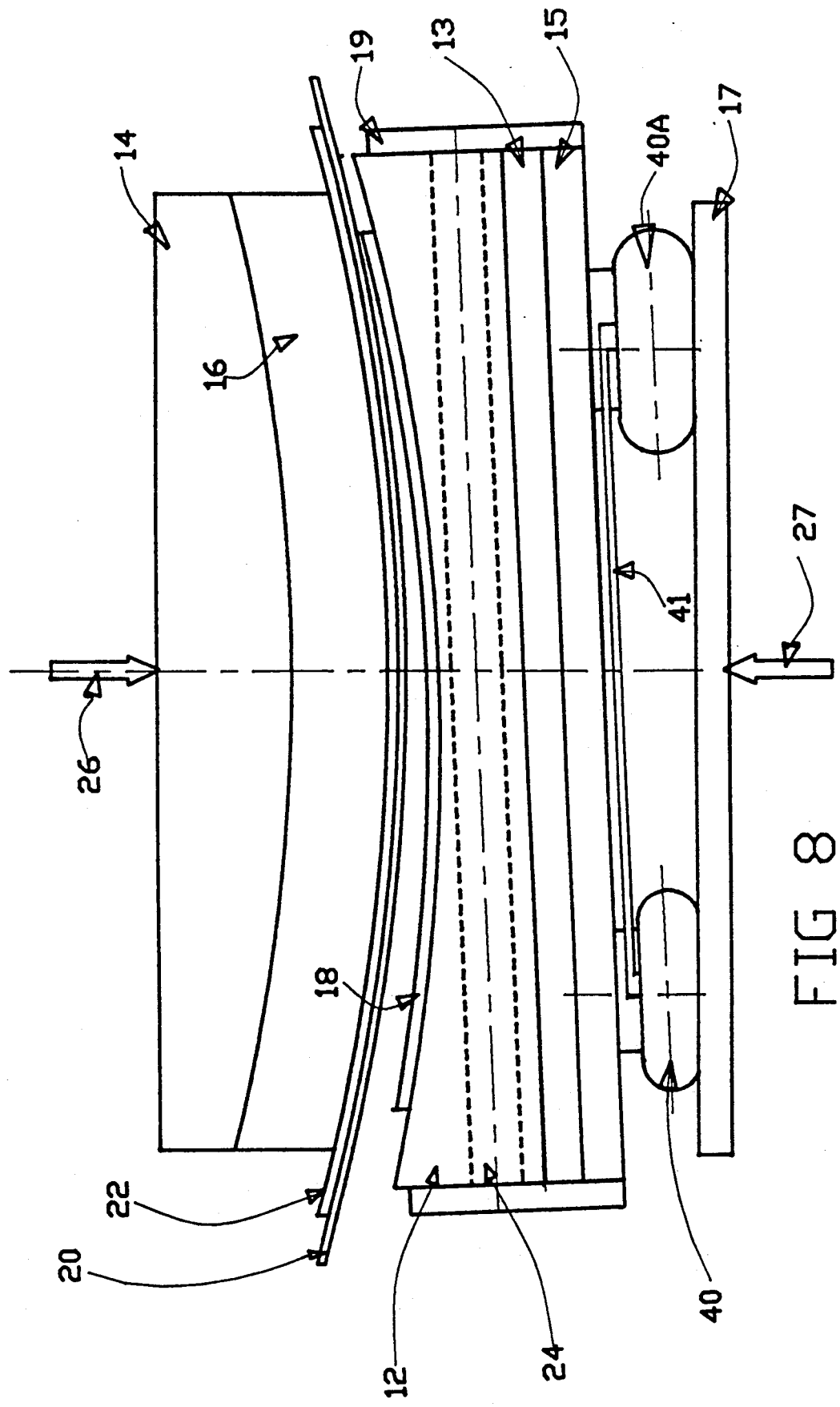
FIG. 8 is a notional side view of a still further embodiment of the apparatus of the invention.

Finally, turning to FIG. 8, a further embodiment of the invention is shown where the contact pressure of the ram 14 against the plastic film 20, and of the plastic film 20 against the glass 18, progresses from one edge of the glass 18 to the other. Here, a slight tilt is effected between the ram 14 and the saddle 12—and their opposed faces and the glass 18 sitting on the saddle 12—so that as the distance between the ram 14 and the saddle 12 is closed, contact is first made by the ram 14 against the plastic film 20 at the extreme right edge of the ram as indicated in FIG. 8. Thus, the ram first contacts the plastic film 20 near the edge thereof, and in a position that is over the edge of the glass 18. As the distance between the ram 14 and the saddle 12 is closed, and the closing pressure 26 and 27 continues in the directions shown, a "rolling" contact line between the plastic film 20 and the glass 18 develops. That contact line moves progressively across the glass 18 from the right to the left edge as shown in FIG. 8, because of the elastically deformable nature of the layer 16 on the ram 14. Thereafter, as the distance between the ram 14 and the saddle 12 reaches a predetermined distance so that the pressure within the elastically deformable layer 16 on the ram 14 is constant across its entire area, then the heating cycle whereby heat is transferred quickly to the glass 18 and plastic film 20—usually from the saddle 12—is initiated. The tilt between the ram 14 and the saddle 12 is exaggerated for purposes of illustration in FIG. 8; and in practice is a matter of fractions of a degree. The tilt may be accommodated by different sizes of fluid bags 40 and 40A as indicated in FIG. 8, or by placing a shim under one side of the fluid bags or the table 17 or steel plate 15, as necessary and convenient.

There has been described an apparatus for laminating polymer plastic to precast glass, methods for achieving the laminated structures, and the structures themselves. The scope of the present invention is defined by the appended claims.

I claim:

1. A method of laminating a layer of non-oriented polymer plastic to a precast layer of glass, comprising the steps of:
    (a) obtaining a precast layer of glass, said glass having a first face and second face;
    (b) placing said precast layer of glass on a saddle such that said first face of said precast layer of glass contacts an upper face of said saddle, which upper face is contoured to substantially the identical contour of said first face of said precast layer of glass, and which saddle is adapted to transmit heat to and absorb heat from said precast layer of glass;
    (c) disposing a polymer plastic film at a distance away from said second face of said glass;
    (d) introducing a contoured ram and an intermediate layer of hard flexible material above said polymer plastic film, said ram having a lower surface that is contoured to substantially the identical contour of said second face of said precast layer of glass, said intermediate layer having a surface initially more convexly contoured than the lower surface of the ram and placed below said lower surface of said ram so as to face said polymer plastic film;

(e) closing the distance between said contoured ram and polymer plastic film, such that a central portion of said initially convexly contoured layer of hard flexible material first contacts a central portion of said polymer plastic film and then continues to stretch and force said polymer plastic film into initial contact with a central portion of said second face of said precast layer of glass and resultingly applying a pressure thereto;

(f) increasing the pressure between said ram and said precast layer of glass so as to stretch and force the plastic film into increasingly greater contact area with said precast layer of glass whereby the contour of the intermediate layer increasingly conforms to the contour of the lower surface of the ram;

(g) increasing the pressure between said ram and said precast layer of glass up to a predetermined level, and maintaining the pressure at that level;

(h) heating said combination of the precast layer of glass and the polymer plastic film to a predetermined temperature, and maintaining said combination of the precast layer of glass and the polymer plastic film at least at that temperature for at least a predetermined period of time;

(i) thereafter, cooling said combination of the precast layer of glass and the polymer plastic film to at least a predetermined temperature;

(j) thereafter, releasing the pressure of said ram against the by then laminated polymer plastic film and precast glass; and (k) thereafter, removing the laminated plastic and precast glass composite structure from said saddle.

2. The method of claim 1, wherein said saddle has high heat transfer characteristics, whereby said heating of said combination of the precast layer of glass and the polymer plastic film to a predetermined temperature, and said cooling of said combination, occur quickly.

3. The method of claim 1, wherein said ram has high heat transfer characteristics, whereby said heating of said combination of the precast layer of glass and the polymer plastic film to a predetermined temperature, and said cooling of said combination, occur quickly.

4. The method of claim 1, wherein said intermediate layer of a hard flexible material is clamped together with said ram so as to be movable therewith, and an extendible piston acts against the side of said hard flexible material facing said ram at the centre thereof so as to flex said hard flexible material from a central portion thereof independently of said ram;

said method comprising the further steps of:

(l) prior to step (e), extending said extendible piston against said hard flexible material so as to first contact said polymer plastic film at a central portion thereof;

(m) thereafter, executing step (e) while, at the same time, gradually withdrawing said extendible piston away from said flexible material while maintaining some pressure thereagainst, so that a progressively larger area of said film will contact said precast glass; and (n) thereafter, when said extendible piston has been fully withdrawn and said film and glass are in contact over the entire area, proceeding with steps (g) et seq.

5. The method of claim 4, wherein one of said saddle and said ram is constantly heated, and the other of said saddle and said ram is cooled sufficiently when required so as to thereby cool said combination of the pre-cast layer of glass and the polymer plastic film, and thereby so as to cause gross heat transfer away from said combination of glass and the polymer plastic film being laminated thereto.

6. The method of claim 5, wherein said saddle is constantly heated.

7. The method of claim 2, where an intermediate layer of a hard flexible material is clamped together with said ram so as to be movable therewith, and an extendible piston acts against the side of said hard flexible material facing said ram at the centre thereof so as to flex said hard flexible material from a central portion thereof independently of said ram;

said method comprising the further steps of:

(l) prior to step (e), extending said extendible piston against said hard flexible material so as to first contact said polymer plastic film at a central portion thereof;

(m) thereafter, executing step (e) while, at the same time, gradually withdrawing said extendible piston away from said flexible material while maintaining some pressure thereagainst, so that a progressively larger area of said film will contact said precast glass; and (n) thereafter, when said extendible piston has been fully withdrawn and said film and glass are in contact over the entire area, proceeding with steps (g) et seq.

8. The method of claim 4, wherein said polymer plastic film is a single layer chosen from the group consisting of polyvinyl butyral and polyurethane, wherein said intermediate layer of hard flexible material is a second precast layer of glass.

9. The method of claim 7, wherein said polymer plastic film is a single layer chosen from the group consisting of polyvinyl butyral and polyurethane, wherein said intermediate layer of hard flexible material is a second precast layer of glass.

10. The method of claim 4, further comprising the steps of:

(o) after step (c), repeating steps (a) through (c) with a second precast layer of glass having a first and second face and a second polymer plastic film such that the second glass layer is disposed above the first polymer film and the second polymer plastic film is disposed above the second glass layer, with the second polymer plastic film chosen from the group consisting of polyvinyl butyral laminated with polyethylene terephthalate and polyurethane laminated with polyethylene terephthalate; and (p) thereafter proceeding with steps (d) et seq, wherein all of the subsequent steps refer to the second polymer plastic film and the second precast layer of glass to form a glass composite comprising two layers of glass and two polymer films.

11. The method of claim 7, further comprising the steps of:

(o) after step (c), repeating steps (a) through (c) with a second precast layer of glass having a first and second face and a second polymer plastic film such that the second glass layer is disposed above the first polymer film and the second polymer plastic film is disposed above the second glass layer, with the second polymer plastic film chosen from the group consisting of polyvinyl butyral laminated with polyethylene terephthalate and polyurethane laminated with polyethylene terephthalate; and (p) thereafter proceeding with steps (d) et seq. wherein all of the subsequent steps refer to the second polymer plastic film and the second precast layer of glass to form a glass composite comprising two layers of glass and two polymer films.

* * * * *

UNITED STATES PATENT AND TRADEMARK OFFICE
CERTIFICATE OF CORRECTION

PATENT NO. : 5,188,692

DATED : February 23, 1993

INVENTOR(S) : Steven J. Horvath

It is certified that error appears in the above-identified patent and that said Letters Patent is hereby corrected as shown below:

On the title page: Item [75] Inventors: address should be -- 3025 Credit Woodlands, Mississauga, Ontario, Canada L5C 2V3 --.

Signed and Sealed this

Thirtieth Day of November, 1993

*Attest:*

BRUCE LEHMAN

*Attesting Officer*  *Commissioner of Patents and Trademarks*